May 14, 1957 — H. VOGLER — 2,792,343
METHOD AND MEANS FOR PREVENTING INCREASE OF THE SALT
CONCENTRATION IN THE OPERATING MEDIUM CIRCUIT
OF A STEAM POWER PLANT
Filed Aug. 22, 1955
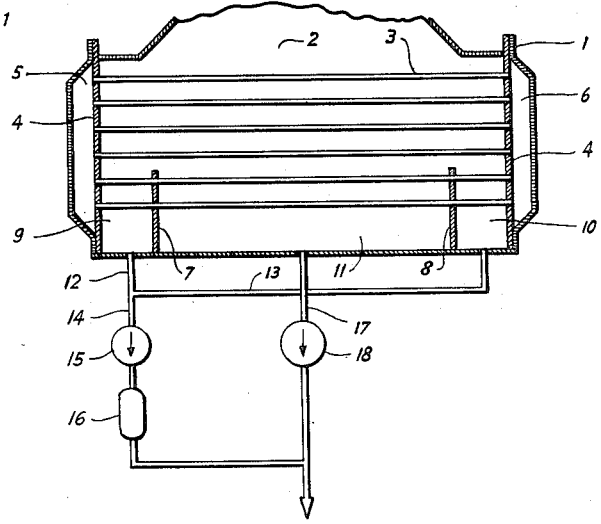
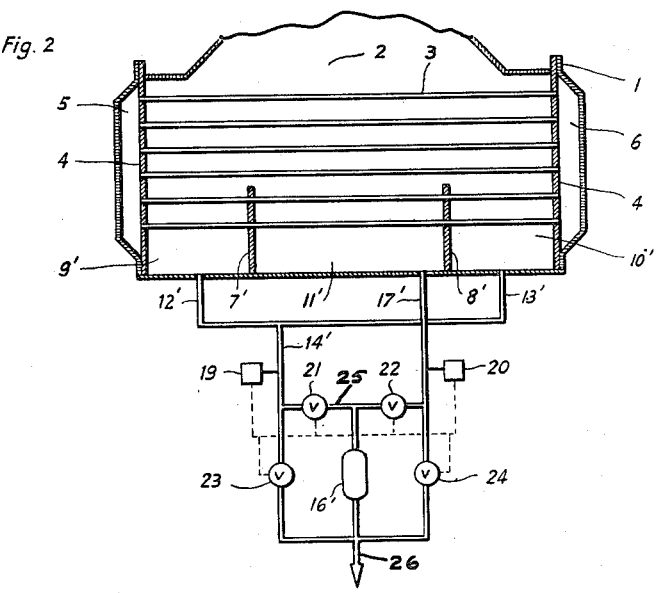
INVENTOR.
HANS VOGLER
BY K. A. Mayr
ATTORNEY.

United States Patent Office 2,792,343
Patented May 14, 1957

2,792,343

METHOD AND MEANS FOR PREVENTING INCREASE OF THE SALT CONCENTRATION IN THE OPERATING MEDIUM CIRCUIT OF A STEAM POWER PLANT

Hans Vogler, Winterthur, Switzerland, assignor to Sulzer Freres, S. A., Winterthur, Switzerland, a corporation of Switzerland Application August 22, 1955, Serial No. 529,792

Claims priority, application Switzerland October 6, 1954

11 Claims. (Cl. 210—25)

The present invention is concerned with a method and means for preventing increase, particularly harmful increase, of the salt concentration in the operating medium circuit of a steam power plant which increase is caused by leakages in the condenser.

Particularly in high pressure steam power plants already small amounts of salt in the feed water can cause great damage. Therefore the feed water once introduced into the circuit and thoroughly purified is used over and over in most cases. Unavoidable feed water losses are replenished by adding small amounts of well purified feed water. In spite of all precautions salt contaminates the feed water during normal operation of the power plant because of leakages in the condenser. Due to the low pressure in the interior of the condenser the impure cooling water penetrates into the operating medium of the plant through untight spots, however small. A desalting plant may be arranged downstream of the condenser with respect to the flow of the feed water in order to remove the salt which entered the condensate in the condenser. However, if one would attempt to design a desalting plant for the total amount of the feed water leaving the condenser, such plant would be very large and expensive.

Experience has shown that condensers usually leak only in a few places. Making use of this fact the condensate can be economically desalted by separating the portion of the condensate adjacent to the leakages from the rest of the condensate and conducting the separated portion through a desalting plant and subsequently reuniting the separated portion with the rest of the condensate. The desalting plant must therefore be designed only for the relatively small amount which condenses adjacent to the leakages.

The parts which are likely to leak are usually known. Sufficient security against salt infiltration into the circuit of the operating medium is obtained in most cases by continuously diverting the condensate from the localities where the danger of contamination of salt is greatest and by separately desalting the diverted condensate and returning the purified condensate to the main stream of the feed water. If there are several places where leakage occurs, the salt concentrations in the condensate from the different places are separately measured and at least the condensate from the place at which the greatest salt concentration occurs is diverted, desalted, and returned to the main stream of the condensate.

In an embodiment of the invention the condenser is subdivided by partitions into several chambers, a condensate diverting or outlet conduit being connected with each space. The diverting conduits of several spaces may be permanently connected with a desalting plant or the individual outlet conduits may be provided with means for individual disconnection from the desalting plant.

The greatest danger of leakage is at the tube plates into which the condenser tubes are expanded. The condenser is therefore preferably divided into two outer spaces including the tube plates and into a central space. If any salt entrance at the tube plates is considered, the diverting conduits connected with the outer spaces may be connected and the single conduit permanently connected with a desalting plant which discharges the desalted condensate into a conduit connected with the central space. If, however, salt infiltration must be expected also in the parts of the condenser distal of the tube plates, a switching arrangement is preferably provided which affords selective discharge of the desalted water from the outer spaces into the outlet conduit of the central chamber or connection of the outlet conduit of the central space with the desalting plant for desalting the condensate from the central space. In the latter case the discharge conduit from the desalting plant, which discharge conduit carries desalted condensate, is connectable with the outlet conduits of the outer spaces. The switching arrangement may be controlled by means of devices measuring the electric conductivity of the water in the individual conduits connected with the individual condenser spaces. This control arrangement makes use of the fact that the electric conductivity of water changes according to the salt concentration in the water. The partitions dividing the condenser into three spaces may be so arranged that the condensing surface pertaining to the central space is about equal to the sum of the condensing surfaces pertaining to the outer spaces. In this way the desalting plant receives substantially the same amounts of water to be desalted when it is connected for desalting the condensate from the two outer spaces as when it is connected for desalting the water from the central space. The size of the desalting plant can therefore be small.

The novel features which are considered characteristic of the invention are set forth with particularity in the appended claims. The invention itself however and additional objects and advantages thereof will best be understood from the following description of embodiments thereof when read in connection with the accompanying drawing in which Fig. 1 is a diagrammatic illustration of a system according to the invention;

Fig. 2 is a diagrammatic showing of a modified system according to the invention.

The same numerals designate the same parts in all figures.

Referring more particularly to Fig. 1 of the drawing, numeral 1 designates a condenser into which flows the steam to be condensed through an inlet 2. The cooling water flows through tubes 3 which are rolled or expanded into tube plates 4. It enters the tubes through a header 5 and leaves the tubes through a header 6. The bottom of the condenser 1 where the condensate accumulates is subdivided by partitions 7 and 8 into outer spaces 9 and 10 and into a central space 11. Conduits 12 and 13 which are individually connected with the outer spaces are united to a discharge pipe 14 in which an auxiliary condensate pump 15 and a conventional desalting plant are arranged. The conduit 14 terminates downstream of a condensate pump 18 in a discharge conduit 17 connected with the central space.

The cooling water entering the interior of the condenser through the tube holes of the tube plates 4 collects together with the condensate only adjacent to the tube plates in the outer spaces 9 and 10. If the condensate collected in these spaces is purified, there is a reasonable security against entry of salt into the main circuit of the operating medium.

In the embodiment according to Fig. 2 the separating walls or partitions 7' and 8' are closer to the center of the condenser than in the plant according to Fig. 1 so that the central collecting space 11' is about equal to the sum of the outer collecting spaces 9' and 10'. The outlet conduits 12' and 13' of the outer spaces are combined in a conduit 14' in which an electric conductivity meter 19 is arranged. A similar meter 20 is arranged in the discharge conduit 17' of the central space 11'. By measuring the electric conductivity of the condensate in the discharge conduits 14' and 17' the salt concentration of the water in these conduits can be found. A conduit 25 interconnects the conduits 14' and 17' and is connected with a desalting device 16', which discharges the desalted water through a conduit 26. The conduits 14' and 17' terminate in the conduit 26. A valve 21 is interposed in the conduit 25 between the conduit 14' and the device 16' and a valve 22 is interposed in the conduit 25 between the conduit 17' and the device 16'. Valves 23 and 24 are individually interposed in the parts of the conduits 14' and 17', respectively, which bypass the device 16'.

The valves 21, 22, 23 and 24 are controlled in a conventional manner by the electric conductivity meters 19 and 20 so that at a preponderance of the salt concentration in the conduit 14' the valves 22 and 23 are closed and the valves 21 and 24 are opened and that at a preponderance of the salt concentration in the conduit 17' the valves 21 and 24 are closed and the valves 22 and 23 are opened. In this way the condensate portion having the greater salt concentration is always conducted through the desalting device 16' so that not only the decontaminations caused by leakages of the tube plates 4 but also the decontaminations caused by leakages in the condenser tubes 3 can be removed. Since the central collecting space is about equal to the sum of the outer collecting spaces, the desalting plant 16' receives about the same amount of condensate, whether it is connected with the conduit 14' or with the conduit 17', and the capacity of the plant 16' need only be about one half of the capacity of a plant which would have to be provided if the total amount of condensate would have to be desalted.

While specific emodiments of the invention have been shown and described, it will be apparent to those skilled in the art that various changes, modifications, substitutions, additions and omissions may be made therein without departing from the spirit and scope of the invention as set forth in the appended claims.

What is claimed is:

1. A method for preventing increase of the salt concentration in the operating medium circuit of a steam power plant due to leakages in the condenser, comprising diverting the condensate collecting adjacent to the leakages from the rest of the condensate, desalting the diverted condensate, and uniting the desalted condensate with the rest of the condensate.

2. The method defined in claim 1 in which the condensate collected adjacent to leakages causing the highest salt concentration is diverted, desalted, and united with the condensate collected adjacent to leakages causing a relatively low salt concentration and with the rest of the condensate.

3. The method according to claim 1 including the step of measuring the salt concentration of condensate collected adjacent to individual leakages, diverting the condensate portion having the highest salt concentration from the rest of the condensate, desalting the diverted portion, and uniting the desalted condensate portion with the condensate collected adjacent to leakages causing a relatively low salt concentration and with the rest of the condensate.

4. A system for preventing increase of the salt concentration in the operating medium circuit of a steam power plant due to leakages in the condenser, comprising partitions in the condenser dividing the interior of the condenser into a plurality of condensate collecting spaces, a condensate outlet conduit connected with each space, a desalting plant interposed in at least one of said outlet conduits, and a discharge conduit connected with said desalting plant for removing the desalted condensate from said desalting plant, said discharge conduit being connected with at least one of said outlet conduits other than the conduit in which said desalting plant is interposed for uniting the desalted condensate with the rest of the condensate.

5. The system defined in claim 4 in which the outlet conduit in which said desalting plant is interposed is permanently open for condensate flow from at least one of said collecting spaces into and through said desalting plant.

6. The system defined in claim 4 in which said partitions divide the interior of the condenser into two outer spaces which are adjacent to the tube plates of the condenser and into a central space.

7. The system according to claim 6 including a conduit connected to the outlet conduits of said outer spaces, said desalting plant being interposed in said last mentioned conduit, and said discharge conduit terminating in the outlet conduit of said central space.

8. The system according to claim 6 including a first pipe connected to the outlet conduits of said outer spaces, a connecting conduit between said pipe and the outlet conduit of said central space, a second pipe connected to said first pipe, said desalting plant being interposed in said second pipe, said first pipe and the outlet conduit of said central space being connected with said discharge conduit; valve means interposed in said connecting conduit, and valve means interposed in said first pipe and in said outlet conduit of said central space, said last mentioned valve means being placed downstream of the points where said connecting conduit is connected with said first pipe and with said outlet conduit of said central space for selectively conducting condensate from said outer spaces or from said central space through said desalting plant.

9. The system defined in claim 6, in which the collecting area of the central collecting space is approximately equal to the sum of the collecting areas of the two outer collecting spaces.

10. A system for preventing increase of the salt concentration in the operating medium circuit of a steam power plant due to leakages in the condenser, comprising partitions in the condenser dividing the interior of the condenser into a plurality of condensate collecting spaces, a condensate outlet conduit connected with each space, a desalting plant, said outlet conduits being selectively connectable with said desalting plant, and a discharge conduit connected with said desalting plant for removing the desalted condensate from said desalting plant, said discharge conduit being connected with said outlet conduits for uniting the desalted condensate with the condensate flowing through the outlet conduits which are not connected with said desalting plant.

11. The system according to claim 10, including conductivity measurement devices arranged in each outlet conduit and controlling means for selectively connecting one or more outlet conduits with said desalting plant.

References Cited in the file of this patent

FOREIGN PATENTS 455,148    Germany _____ Mar. 24, 1927